July 29, 1958
L. F. STRINGER
2,845,586
MOTOR CONTROL SYSTEMS
Filed Sept. 20, 1954
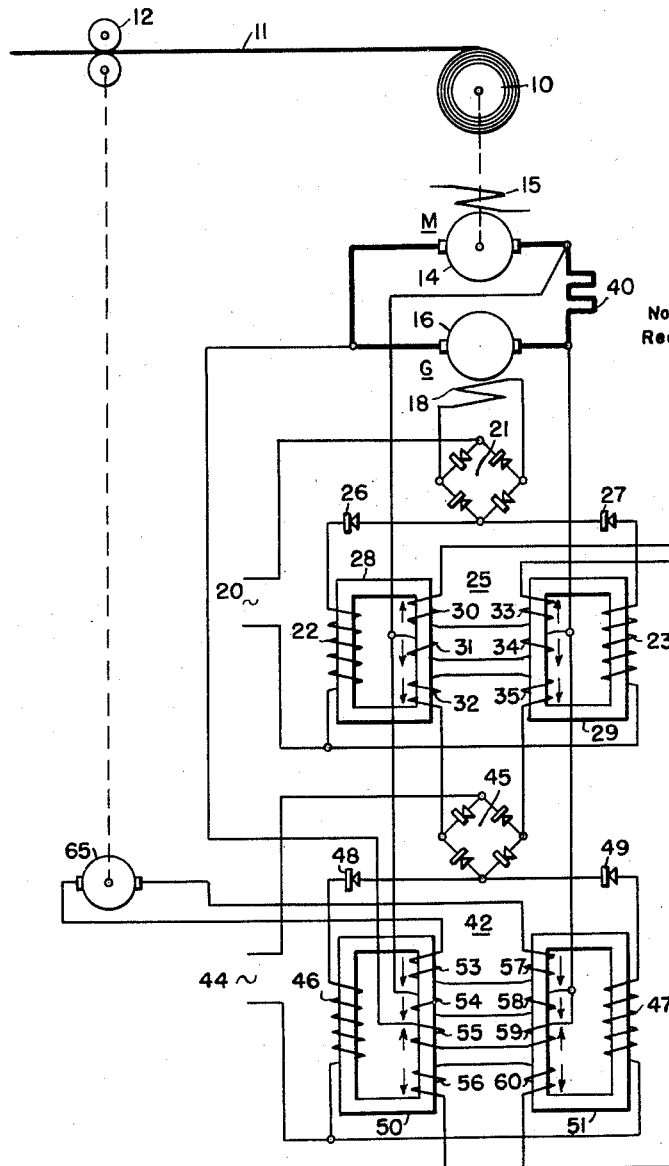
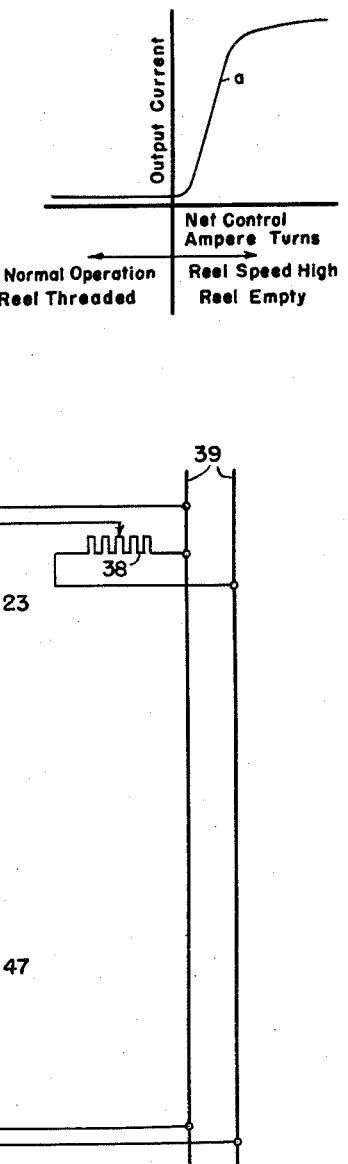
WITNESSES:
E. A. McCloskey
F. V. Giolma
INVENTOR
Loren F. Stringer.
BY
Paul E. Friestemann
ATTORNEY United States Patent Office 2,845,586
Patented July 29, 1958

2,845,586

MOTOR CONTROL SYSTEMS

Loren F. Stringer, Pitcairn, Pa., assignor to Westinghouse Electric Corporation, East Pittsburgh, Pa., a corporation of Pennsylvania Application September 20, 1954, Serial No. 457,115

5 Claims. (Cl. 318—6)

My invention relates, generally, to motor control systems, and it has reference in particular to speed limit systems for motors such as used in reel drives or the like.

Generally stated, it is an object of my invention to provide for using magnetic amplifiers in a speed limit system for a reel motor.

More specifically, it is an object of my invention to provide for using the unilateral characteristic of a magnetic amplifier of the self-saturating type for obtaining speed limit excitation for a motor, only when it exceeds a predetermined speed relation.

Another object of my invention is to provide for changing a current regulator to a speed regulator by using a magnetic amplifier to furnish speed limit excitation when the speed of the motor exceeds a predetermined relation to the speed of an associated work device.

Yet another object of my invention is to provide in a control system for a reel motor for normally supplying to a regulator for the motor a voltage proportional to the motor armature current, and for using a magnetic amplifier for supplying to the regulator a speed limit control voltage, only when the speed of the reel motor exceeds the speed of an associated work device supplying material to the reel by a predetermined value.

Other objects will, in part, be obvious and will, in part, be explained hereinafter.

In practicing my invention in one of its forms, the armature of a reel motor is connected in a closed circuit with the armature of a generator having a field winding which is normally energized under the control of a magnetic amplifier responsive to the armature current for maintaining a predetermined value of tension in a strip or web of material being supplied to the reel from an associated work device. An additional winding is provided on the magnetic amplifier which is energized under the control of a second magnetic amplifier having control windings energized from a pilot generator driven by the work device and in accordance with the voltage and current of the reel motor. A bias winding normally blocks the second magnetic amplifier, which operates to energize the additional winding on the first-mentioned magnetic amplifier, only when the speed of the reel motor exceeds the speed of the work device by a predetermined amount.

For a more complete understanding of the nature and scope of my invention, reference may be made to the following detailed description which may be read in connection with the accompanying drawing, in which Fig. 1 is a schematic diagram of a reel drive embodying the invention in one of its forms; and Fig. 2 is a characteristic output curve of a magnetic amplifier such as used in practicing my invention.

Referring to Fig. 1 of the drawing, the reference numeral 10 denotes a reel disposed to wind a strip or web of a material 11 proceeding from the rolls 12 of an adjacent work device, such as a mill stand or the like. The reel 10 is driven by a motor M having an armature 14 connected in driving relation with the reel and having a field winding 15 which may be energized from a suitable source of excitation and which may be controlled, if desired, to maintain a substantially constant value of counter-electromotive force in a manner well known in the art. The armature 14 is connected in closed circuit relation with the armature 16 of a generator G having a field winding 18.

The field winding 18 is connected to a source of alternating current 20 through a full-wave rectifier bridge circuit 21 and the load windings 22 and 23 of a magnetic amplifier 25. The windings 22 and 23 are connected in parallel circuit relation and are provided with inversely connected rectifier devices 26 and 27 to provide for unidirectional conduction in opposite senses. The windings 22 and 23 are disposed on magnetic cores 28 and 29 which are also provided with a plurality of control windings 30, 31, 32 and 33, 34, 35, respectively. The windings 30 and 33 are connected cumulatively with respect to the load windings 22 and 23 and are energized through a potentiometer 38 from the conductors 39 of a constant potential source. The windings 31 and 34 are connected in opposition to the windings 30 and 33, which may be designated as the pattern windings, and are connected across a resistor 40 in series with the armatures 14 and 16 so as to be responsive to the current in the armature circuit.

Normally, the excitation produced by the current windings 31 and 34 balances that of the pattern windings 30 and 33, and the magnetic amplifier 25 functions as a current regulator to maintain a predetermined tension in the strip 11. In order to provide for limiting the speed of the motor M, when the reel is empty, or when the strip breaks, the control windings 32 and 35 are used as speed limit windings. These windings are connected by means of a magnetic amplifier 42 so as to be energized only when the speed of the reel motor exceeds the speed of the mill stand by a predetermined amount. The windings 32 and 35 are connected to a source of alternating current 44 through a rectifier bridge circuit 45, and the load windings 46 and 47 of the magnetic amplifier 42, which are connected in parallel circuit relation with inversely connected rectifier devices 48 and 49. The load windings 46 and 47 are disposed on magnetic cores 50 and 51 which are also provided with a plurality of control windings 53, 54, 55, 56 and 57, 58, 59, 60, respectively. The windings 56 and 60 are bias windings, and are connected to the constant potential bus conductors 39 in opposition to the load windings 46 and 47. The windings 54 and 58 are connected cumulatively with respect to the bias windings across the resistor 40 so as to be energized in accordance with the armature current. The windings 55 and 59 are connected across the generator G in opposition to the current windings so as to provide a net effect therebetween corresponding to the counter-electromotive force of the motor which is proportional to the speed of the motor. The windings 53 and 57 are energized in opposition to the voltage windings from a pilot generator 65 driven by the rolls 12 so as to provide an indication of the speed of the mill stand and the strip 11.

In normal operation, the speed of the rolls 12 will fairly closely match the speed of the motor M, so that the net excitation of the current, voltage and pilot generator windings on the magnetic amplifier 42 is substantially zero. Because the bias windings 56 and 60 are in opposition to the load windings 46 and 47, the output of the magnetic amplifier 42 will be substantially zero as shown by the left-hand portion of curve (a) of Fig. 2. Under these conditions, the excitation of the current windings 31 and 34 of the magnetic amplifier 25 will substantially balance the excitation of the pattern windings 30 and 33, so that the regulator 25 regulates to maintain a predetermined value of armature current, as determined by the setting of the potentiometer 38.

Should the strip 11 break, tension will be lost, and the excitation of the current windings 31 and 34 will be substantially reduced. The magnetic amplifier 25 would normally attempt to weaken the excitation of field winding 18 and increase the speed of the motor M to regain tension. When the reel 10 is empty or when the strip is broken, this results in excessive reel speeds. As the speed of the reel motor increases, the net effect of the current and voltage windings 54, 58, and 55, 59 increases so that it overbalances the output of the pilot generator 65. The speed limit magnetic amplifier 42 thereupon produces a rising output as shown by the central portion of curve (a) in Fig. 2, which results in energization of the current limit windings 32 and 35. This excitation compensates for the reduced excitation of the current windings, and limits the speed of the reel motor by increasing the excitation of field winding 18.

From the above description and the accompanying drawing, it will be apparent that I have provided in a simple and effective manner for limiting the speed of a reel motor or other current regulated motor. Because of the essentially unilateral characteristic of the magnetic amplifier 42, which is of the self-saturating type, unidirectional excitation of the speed limit windings on the current regulator is readily effected without any fear of reverse excitation of these windings during operation below normal speeds. The speed limit features of my invention may be readily incorporated in existing apparatus and require a minimum of additional equipment. Since the magnetic amplifier involved no moving parts, it provides a reliable and economical control for limiting the speed of a current-regulated motor.

While the invention has been shown as applied to a regulator of the magnetic amplifier type, it is realized that the current regulator may, if desired, be of the rotating regulator type or any other suitable type. Although the current regulator has been shown with separate excitation windings with the different signals being applied thereto individually, it is realized that the signals may be mixed, if desired, and applied to a single winding, without departing from the scope of the invention.

Since certain changes may be made in the above-described construction and different embodiments of the invention may be made without departing from the spirit and scope thereof, it is intended that all matter contained in the foregoing description or shown in the accompanying drawing shall be considered as illustrative and not in a limiting sense.

I claim as my invention:

1. In a control system for a motor having an armature and a field winding, a generator having an armature connected in series with the motor armature and having a field winding, current regulating means having an output circuit connected in circuit with the generator field winding and having control excitation means, circuit means for applying to the control excitation means current responsive and reference voltages, and means including a magnetic amplifier having excitation means responsive to the speed of the motor and an associated work device, and an output circuit controlled by said excitation means for applying a control voltage to the control excitation means only when the speed of the motor exceeds a predetermined relation with that of the work device.

2. In a motor control system, a generator for supplying electrical energy to the motor, said generator having an armature connected in circuit with the motor and having a field winding, means for supplying excitation to said field winding including an amplifier having input excitation means and output excitation means connected in circuit with said field winding, circuit means for applying to said input excitation means opposing signals in accordance with the armature current and an adjustable reference quantity to regulate for a predetermined value of armature current, and means including a magnetic amplifier of the self-saturating type connected to apply a signal to the input excitation means in accordance with the differential between the speed of the motor and the speed of an associated work device.

3. In a control system for a motor, a generator having an armature and a field winding, circuit means connecting the armature in circuit with the motor, means connecting the field winding to a source of electrical energy comprising current regulating means having a plurality of control windings including opposed windings respectively energized in accordance with a fixed reference quantity and the armature current to maintain a predetermined value of armature current, and means connecting another of said plurality of windings to a source of electrical energy comprising a magnetic amplifier having excitation means energized in accordance with a differential between the speed of the motor and the speed of an associated work device.

4. In a control system for a motor having an armature and a field winding, a generator having an armature connected in series with the motor armature and having a field winding, a current regulating magnetic amplifier having load windings connecting the generator field winding to a source of electrical energy and having a plurality of control windings, means for energizing different of said control windings in opposed senses in accordance with the armature current of the motor and an adjustable reference voltage, and means for energizing another of said control windings including a magnetic amplifier having load windings connected to a source of alternating current and to said another control winding through a rectifier bridge circuit, and having a plurality of control windings, including a pair oppositely energized in accordance with the speeds of the motor and an associated work device.

5. In a control system for a motor having an armature and a field winding, a generator having an armature connected in closed circuit relation with the motor armature and having a field winding, a first current regulating magnetic amplifier having a pair of load windings connected each with a rectifier device in inverse parallel relation, rectifier means connecting the generator field winding to a source of alternating current through said load windings, a plurality of control windings for said magnetic amplifier including a cumulative pattern winding connected to an adjustable reference source and a current winding energized differentially in accordance with the armature current of the motor to normally maintain a predetermined value of motor armature current, and circuit means connecting another of said plurality of control windings to a source of alternating current comprising a second magnetic amplifier having load windings connecting said another control winding to a source of alternating current through a rectifier bridge circuit and a plurality of control windings including opposed windings energized in accordance with the armature current and voltage of the generator, said second magnetic amplifier having another control winding energized cumulatively with respect to the current control winding in accordance with the speed of an associated work device.

References Cited in the file of this patent

UNITED STATES PATENTS

| | | |
|---|---|---|
| 2,550,104 | Albert | Apr. 24, 1951 |
| 2,611,114 | Fisher | Sept. 16, 1952 |
| 2,688,111 | Jones | Aug. 31, 1954 |
| 2,735,053 | Storey et al. | Feb. 14, 1956 |